3,522,324
ALKYLATION OF AROMATICS USING ORGANIC ALUMINUM HALIDE - ALKYL HALIDE CATALYST SYSTEM
Walter A. Butte, Jr., West Chester, Pa., assignor to Sun Oil Corporation, Philadelphia, Pa., a corporation of New Jersey
Filed Sept. 10, 1968, Ser. No. 758,769
Int. Cl. C07c 3/56, 15/00
U.S. Cl. 260—671            11 Claims

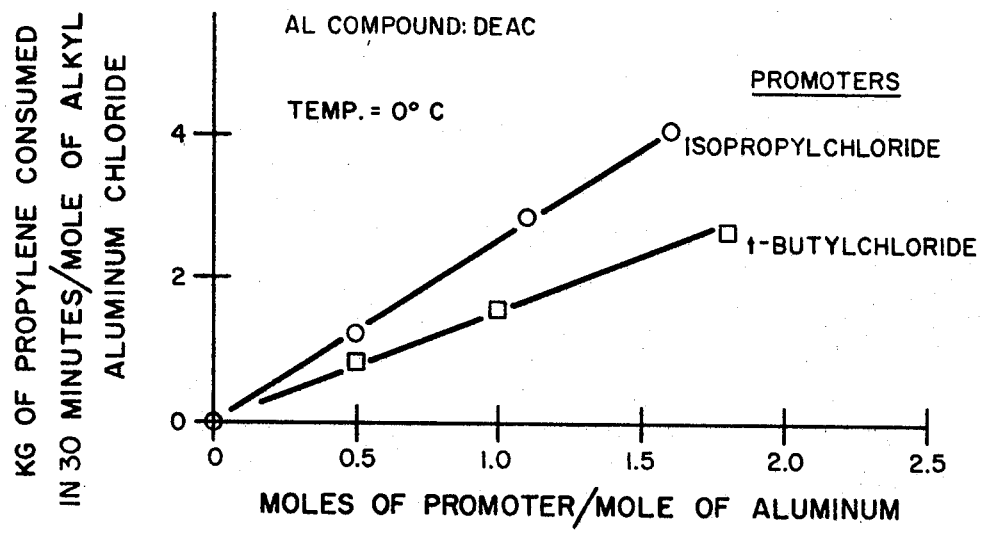
FIGURE IA
FIGURE IB
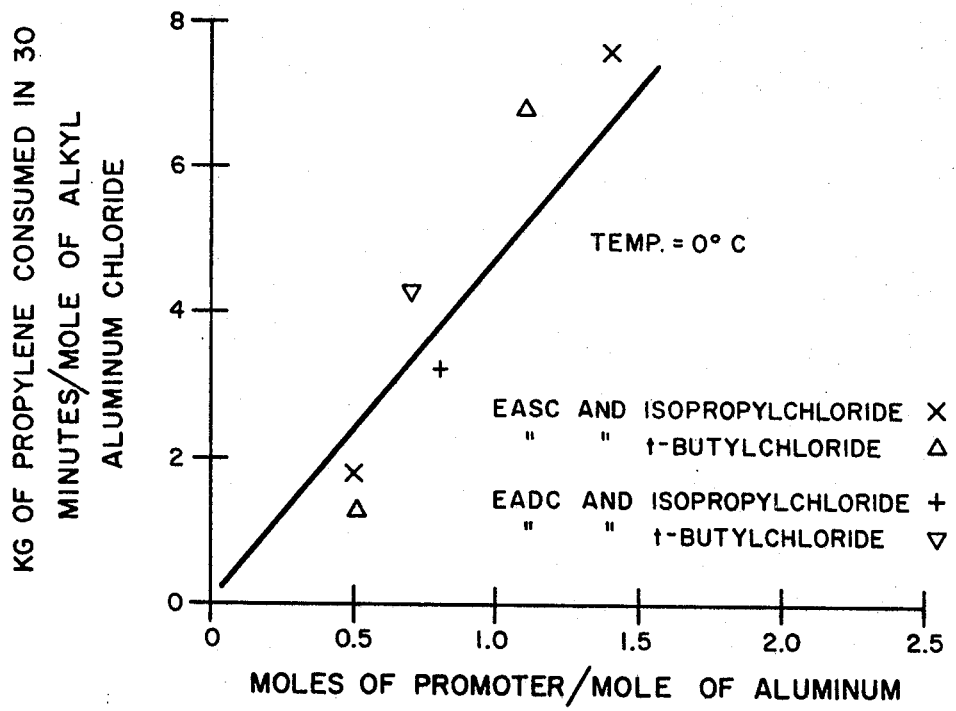

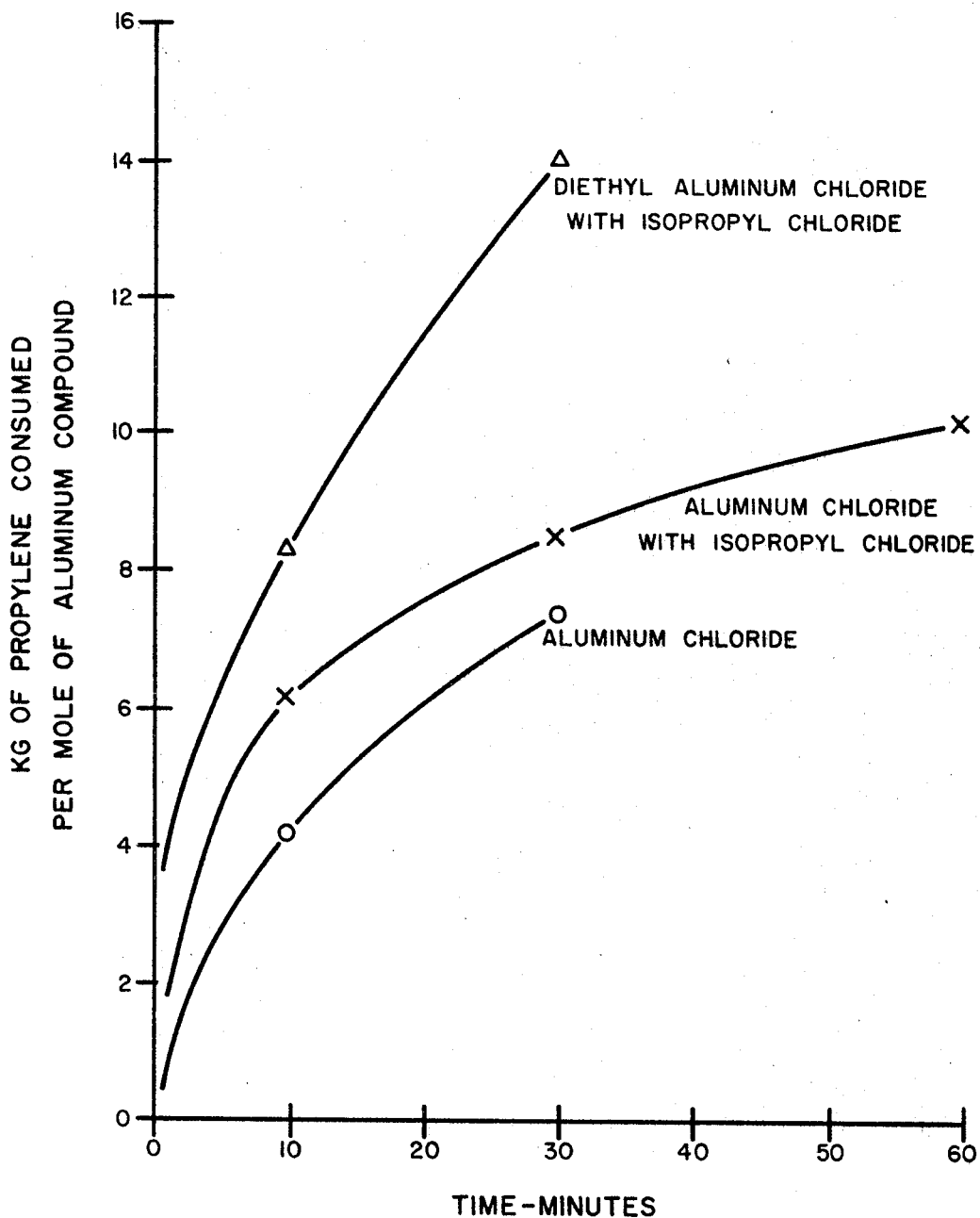

ABSTRACT OF THE DISCLOSURE

A highly selective process by which aromatic hydrocarbons are alkylated by monoolefinic hydrocarbons at a temperature of $-50°$ C. to $+50°$ C., preferably $-30°$ C. to $+30°$ C., with a catalyst comprising (1) an organic aluminum halide which is $RAlX_2$, $R_2AlX$ or $R_3Al_2X_3$ where R is an alkyl group containing 1 to 8 carbon atoms and X is Cl, Br or I and (2) an alkyl chloride, bromide or iodide having 3 to 8 carbon atoms. An example of the selectivity of this process is indicated by the high yields of 1,2,3,5-tetraisopropylbenzene when alkylating 1,3,5-triisopropylbenzene with propylene.

BACKGROUND OF THE INVENTION

This invention relates to a highly selective process for alkylating aromatic hydrocarbons with monoolefinic hydrocarbons at specified conditions using certain alkyl aluminum halide-alkyl halide catalyst systems.

The prior art (U.S. Pat. 3,312,748 of B. H. Johnson, issued Apr. 4, 1967) discloses that aromatics can be alkylated with olefins in the presence of an aluminum alkyl halide co-catalyst system comprising (1) $CX_4$ or $RCX_3$ where X is Cl or Br and R is a $C_1$ to $C_{10}$ alkyl group and (2) $AlR_{3-n}X_n$ where R is an alkyl group or aryl group and X is Cl or Br and $n$ is 0, 1 or 2. For example, benzene can be alkylated with pentene-1 in the presence of carbon tetrachloride and aluminum triethyl to form amylbenzene as a major component.

Also, according to the prior art attempts to introduce three or four isopropyl groups adjacent to each other on an aromatic ring have not been successful (Friedel-Crafts and Related Reactions, vol. II, part 1, p. 17, 1964, G. A. Olah; Newton, J. A. Chem. Soc., 65, 320; Ipatieff et al., ibid., 58, 919).

SUMMARY OF THE INVENTION

The invention provides a process, with high selectivity, for alkylating aromatic hydrocarbons at a rapid rate with monoolefinic hydrocarbons. The process comprises mixing the aromatic and olefin with a catalyst system comprising an alkyl aluminum halide and a promoter. The alkyl aluminum halides are $RAlX_2$, $R_2AlX$ or $R_3Al_2X_3$ where R is an alkyl group containing 1 to 8 carbon atoms and X is Cl, Br or I. The promoter is a $C_3$–$C_8$ alkyl chloride, bromide or iodide. Aromatic hydrocarbons having at least two unsubstituted ring positions can be used; more preferably aromatic hydrocarbons having the formula:

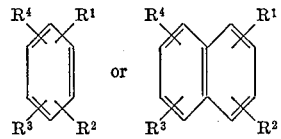

where each of $R^1$, $R^2$, $R^3$ and $R^4$ is H or an alkyl group with one to twelve carbon atoms. The monoolefinic hydrocarbons are $C_nH_{2n}$ or $C_nH_{2n-2}$ wherein $n$ is 3 to 12. The $C_nH_{2n-2}$ olefins are cycloolefins, an example being cyclopentene. Alkylation of the aromatic hydrocarbon is readily effected by contacting the aromatic and monoolefin with the catalyst system at a temperature in the range of $-50°$ C. to $+50°$ C., more preferably $-30°$ C. to $+30°$ C.

BRIEF DESCRIPTION OF THE DRAWINGS

FIGS. I-A and I-B indicate the effectiveness of the present catalyst systems upon the alkylation rates of aromatic hydrocarbons and are based on the results described in Example I hereinafter. FIG. I-A indicates the influence of diethyl aluminum chloride (DEAC) and alkyl halides on the propylene alkylation rate of benzene. FIG. I-B indicates similar influences with ethyl aluminum sesquichloride (EASC) and alkyl halides or ethyl aluminum dichloride (EADC) and alkyl halides. FIG. II compares the catalyst system of this invention with other catalyst systems, such as $AlCl_3$, when these other systems are used for alkylating aromatics.

DESCRIPTION OF THE INVENTION

One component used in formulating the catalyst system defined herein is a hydrocarbyl aluminum chloride or bromide or iodide corresponding to any of the following formulas: $RAlX_2$, $R_3Al_2X_3$ and $RAlX$. In other words the compound is a hydrocarbyl aluminum dihalide, sesquihalide or monohalide wherein the halogen (X) is chlorine, bromine or iodine, preferably chlorine or bromine. In the foregoing formulas R represents an alkyl group containing 1 to 8 carbon atoms, preferably 1 to 4 carbon atoms such as methyl, ethyl, propyl, isopropyl, isobutyl, normal butyl, etc. Examples of this compound include diethyl aluminum chloride, ethyl aluminum sesquichloride, ethyl aluminum dichloride, methyl aluminum sesquichloride, isobutyl aluminum sesquichloride, n-butyl aluminum dibromide, n-octyl aluminum dichloride, 4-methylheptane aluminum dichloride, ethyl aluminum diiodide, etc.

The alkyl halide used in this invention as part of the catalyst system is an alkyl chloride, bromide or iodide having 3 to 8 carbon atoms. The alkyl group contains 3 to 8 carbon atoms, preferably 3 to 6 carbon atoms, such as n-propyl, isopropyl, n-butyl, sec-butyl, t-pentyl, sec-hexyl, sec-octyl, etc. Examples of specific alkyl halides that can be used with this invention are n-propyl chloride, isopropyl chloride, isopropyl iodide, t-butyl chloride, t-butyl bromide, sec-butyl chloride, n-amyl chloride, 2-iodo-2-methylbutane, 2-chloro-2,3-dimethylbutane and 3-bromo-4,5-dimethylhexane.

When using the catalyst system defined herein as part of this invention the alkyl group of the alkyl halide may or may not be the same as the alkyl group of the alkyl aluminum halide; likewise the halogen group of the alkyl halide may or may not be the same as the halogen group of the alkyl aluminum halide.

The ratio of the alkyl halide to the alkyl aluminum halide can have an important influence on the rate of alkylation. This is more fully discussed below and is shown in FIGS. I-A and I-B. Specifically within the ratios shown the greater the ratio of the alkyl halide or promoter to alkyl aluminum halide the faster is the rate of alkylation.

FIGS. I-A and I-B relate the kilograms of propylene consumed per mole of alkyl aluminum chloride present in the catalyst versus the moles of promoter per mole of aluminum in the catalyst system.

The quantity of propylene, alkylating the aromatic increases appreciably when, as shown in FIG. I-A, the quantity of isopropyl chloride or t-butyl chloride present in the catalyst system relative to the quantity of DEAC is increased. For example, with sufficient isopropyl chloride and DEAC to have a catalyst system with 1.5 moles of promoter per mole of aluminum the amount of propylene consumed in 30 minutes is almost 3.2 times that consumed when said ratio is 0.5. All the data in FIG. I-A were obtained with the reaction temperature at 0° C.

Also shown in FIG. I-A is that without either promoter no alkylation occurs. Thus when only DEAC is used, i.e., at zero moles of promoter per mole of aluminum, no alkylation of benzene with propylene is obtained. On the other hand the alkylation proceeds when sufficient promoter has been added to obtain 0.5 mole of promoter per mole of aluminum. FIG. I-A indicates that any amount of promoter is operative to give at least some catalytic activity.

FIG. I-B indicates that increasing the amount of isopropyl chloride or t-butyl chloride present in the catalyst system relative to the quantity of EASC increases the quantity of propylene consumed. In this system increasing the moles of promoter per mole of aluminum by 50%, i.e., from 1.0 to 1.5, increases the consumption of propylene by 150%, i.e., from almost 4.8 kilograms consumed to almost 7.2 kilograms.

Also FIG. I-B shows that increasing the amount of isopropyl chloride or t-butyl chloride present in the catalyst system relative to the quantity of EADC also increases the quantity of propylene consumed in a given time period.

In summary, FIGS. I-A and I-B show that increasing the ratio of the promoter to the alkyl aluminum halide increases the amount of monoolefin consumed per mole of alkyl aluminum halide in a given time period and at a given temperature. Yet, an upper limit of amount of the promoter to alkyl aluminum halide is set by practical engineering considerations. With engineering and economic aspects as a consideration, the upper limit as to the ratio of promoter to aluminum is about 10, preferably 4. The promoter can be added to the system all at once, or added as increments over some time period or metered continuously into the system.

Aromatic hydrocarbons having at least two unsubstituted ring positions that can be alkylated using this invention include, in addition to monocyclic aromatics like benzene and toluene, polycyclic aromatics like naphthalene, diphenyl, phenanthrene, anthracene and pyrene. Preferred aromatic hydrocarbons have one or two rings and the following formula:

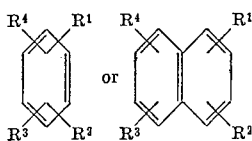

where each of $R^1$, $R^2$, $R^3$ and $R^4$ is H or an alkyl group containing 1 to 12 carbon atoms, preferably 1 to 6 carbon atoms. Examples of the first aromatic hydrocarbon shown are benzene, ethyl benene, 1-methyl-3-ethyl benzene, 1,4-dimethyl-3-isopropyl benzene, 1,2,4-trimethyl-5-propyl benzene, hexyl benzene, 1-phenyl dodecane, etc. Examples of the second aromatic hydrocarbon shown are naphthalene, 2-methylnaphthalene, 2,6-dimethylnaphthalene, 1,3,6-trimethylnaphthalene, 2-propylnaphthalene, 1,2,5,7-tetramethylnaphthalene, 1,3,4,5-tetramethylnaphthalene, 2,3-dihexylnaphthalene, etc. Other examples for both types of aromatic hydrocarbons shown can be found in Handbook of Hydrocarbons, by S. W. Ferris, Academic Press, 1955.

The minimum amount of alkyl aluminum halide, as defined herein, that can be used depends in part upon the amount of impurities in the system. Sufficient alkyl aluminum halide must be present so that after any reactions between the alkyl aluminum halide and impurities there is still remaining enough alkyl aluminum halide to provide an active catalyst system. About 0.1% to 2.0 mole percent of alkyl aluminum halide to aromatic hydrocarbon is a sufficient minimum to meet the requirements of scavenging the reactable impurities and maintaining an adequate reaction rate. The upper limit of about 10 mole percent of alkyl aluminum halide to aromatic hydrocarbon depends upon engineering and economic considerations.

The invention can be practiced using either aliphatic olefins ($C_nH_{2n}$) or cyclic olefins ($C_nH_{2n-2}$) having 3 to 12 carbon atoms per molecule. Examples of the $C_3$–$C_{12}$ alkylating monoolefinic hydrocarbons corresponding to the formula $C_nH_{2n}$ or $C_nH_{2n-2}$ that can be used in this invention are: propylene, 1-butene, 3-methylbutene, cyclopentene, 1-hexene, cyclohexene, 4-decene, 1-ethylcyclooctene, 6-dodecene, 1-heptylcyclopentene, etc.

The alkylating monoolefin need not contain the same number of carbon atoms as the alkyl group of the promoter. One the other hand if the promoter does contain the same number of carbon atoms as the alkylating monoolefin then the quantity of and number of different co-products is minimized. Thus in alkylating benzene with propylene and using isopropylene chloride as a promoter the reaction products are essentially isopropylbenzene and polyisopropylbenzene.

The alkylation reaction can be carried out by contacting the monoolefin either in liquid or vapor phase with the aromatic hydrocarbon at a temperature in the range of $-50°$ C. to $+50°$ C., preferably $-30°$ C. to $+30°$ C. For example, at 0° C. with DEAC and isopropyl chloride, 400 grams of alkyl aromatics per gram of aluminum in the DEAC used were obtained from benzene and propylene at atmospheric pressure in 30 minutes. The lower temperature limit depends in part on the desired alkylation rate while the upper temperature limit depends in part on the selectivity of the catalyst.

When the monoolefin charge is contacted in gaseous form with the solution, as normally will be the case when a lower monoolefin such as propylene is used, the reaction rate will depend not only on the temperature selected but also on the gas pressure, since the pressure will determine the concentration level of the gas dissolved in the solution for contact with the aromatic. While pressures higher than atmospheric can be used to speed up the alkylating rate the higher operating and investment costs associated with the higher pressures have to be balanced against the economic advantages of faster reaction rates.

The following examples are specific illustrations of the invention.

EXAMPLE I

Benzene was alkylated with propylene by means of this invention. Runs 1 to 12, the results of which are shown in Table I, were carried out in a similar manner described herein. First propylene was passed through the reaction vessel to sweep out the air. After sufficient time elapsed to remove the air in the vessel and while maintaining the flow of propylene, benzene and the alkyl aluminum chloride were charged to the vessel which was immersed in an ice bath. While the propylene was bubbling through the solution of the mixture of just benzene and the alkyl aluminum chloride, the solution remained colorless and there was no temperature rise. Upon the addition of the promoter, for example isopropyl chloride, the solution turned yellow and an increase in temperature was observed. After 30 minutes a sample was taken and analyzed by vapor phase chromatography. From the analysis of reaction products the amount of propylene consumed was calculated.

The results of runs 1 to 6, listed in Table I and plotted in FIG. I-A, show that the rate of propylene consumption increases as the moles of promoter per mole of aluminum is increased. Or expressed another way, the more promoter per mole of DEAC in the system the faster is the alkylation rate. Comparison of the effect of isopropyl chloride versus t-butyl chloride as a promoter 1,2,3,5-tetraisopropylbenzene is a white solid with a melting point of 68° C. This compound was separated using preparative scale gas chromatography.

TABLE I

| Run Number | Alkyl aluminum chloride | Promoter | Moles of alkyl aluminum chloride per mole of benzene | Moles of promoter per mole of aluminum | Kilograms of propylene consumed per mole of alkyl aluminum chloride | Data plotted in figure |
|---|---|---|---|---|---|---|
| 1 | DEAC | $(CH_3)_2CHCl$ | 0.02 | 0.5 | 1.2 | I-A |
| 2 | DEAC | $(CH_3)_2CHCl$ | 0.02 | 1.1 | 2.8 | I-A |
| 3 | DEAC | $(CH_3)_2CHCl$ | 0.02 | 1.6 | 3.9 | I-A |
| 4 | DEAC | $(CH_3)_3CCl$ | 0.02 | 0.5 | 0.8 | I-A |
| 5 | DEAC | $(CH_3)_3CCl$ | 0.02 | 1.0 | 1.5 | I-A |
| 6 | DEAC | $(CH_3)_3CCl$ | 0.02 | 1.8 | 2.6 | I-A |
| 7 | EASC | $(CH_3)_2CHCl$ | 0.012 | 0.5 | 1.8 | I-B |
| 8 | EASC | $(CH_3)_2CHCl$ | 0.012 | 1.4 | 7.6 | I-B |
| 9 | EASC | $(CH_3)_3CCl$ | 0.012 | 0.5 | 1.3 | I-B |
| 10 | EASC | $(CH_3)_3CCl$ | 0.012 | 1.1 | 6.8 | I-B |
| 11 | EADC | $(CH_3)_2CHCl$ | 0.027 | 0.8 | 3.2 | I-B |
| 12 | EADC | $(CH_3)_3CCl$ | 0.027 | 0.7 | 4.3 | I-B |

NOTE.—All experiments carried out at atmospheric pressure and in an ice bath.

indicates that the former is more effective in this particular system.

The results of runs 7 to 10, listed in Table I and plotted in FIG. I–B show that the more promoter per mole of EASC in the system the faster is the alkylation rate. However, with EASC isopropyl chloride and t-butyl chloride are about equivalent as promoters.

The results of runs 11 and 12, listed in Table I and plotted in FIG. I–B, show that the alkylation rate increases as the proportion of promoter to EADC in the system is increased. The two promoters, isopropyl chloride and t-butyl chloride, appear to be equivalent when used with EADC.

Comparison of runs 7 to 10 with 11 and 12, as shown in FIG. I–B, indicate that EASC and EADC appear to be equivalent when used with either promoter.

EXAMPLE II

The same procedure as outlined in Example I was followed except that 1-amyl chloride was used. The mole ratio of DEAC per mole of benzene was 0.024 and one mole of 1-amyl chloride was used per mole of aluminum compound. After 120 minutes most of the benzene was alkylated as determined by gas chromatography.

EXAMPLE III

The selectivity achievable in the present process was demonstrated by the following run. 23.9 milliliters of 1,3,5-triisopropylbenzene, 1.12 milliliters of DEAC and 0.09 milliliter of isopropyl chloride were charged to a flask under a propylene sweep. The flask was immersed in an ice bath and equipped with a magnetic stirrer. After propylene passed through the stirred mixture for 60 minutes the mixture was analyzed by vapor phase chromatography. The results are as follows.

Percent
1,3,5-triisopropylbenzene converted _____ 13
Composition of alkylation product:
    1,2,3,5-tetraisopropylbenzene _____ 85
    1,2,4,5-tetraisopropylbenzene _____ 15

Runs indicating the non-equivalence of $AlCl_3$ and DEAC as to alkylation rates were performed. Table II lists these runs. Also, the data, kilograms of propylene consumed per mole of aluminum compound versus time, are plotted in FIG. II. In runs 13 and 14, propylene alkylation of benzene was obtained using only aluminum chloride. After 30 minutes, 7.4 kilograms of propylene were consumed per mole of aluminum compound. In runs 15 to 17, isopropyl chloride was added to the $AlCl_3$ and the propylene alkylation rate of benzene increased above that obtained in runs 13 and 14. After 30 minutes, 8.4 kilograms of propylene were consumed per mole of aluminum compound or about 13% more than with $AlCl_3$ alone. For runs 18 and 19, the $AlCl_3$ of runs 15, 16 and 17 was replaced with DEAC and the propylene alkylation rate of benzene increased still further over that obtained in runs 15 to 17. A comparison of run 19 with run 16 indicates that with the catalyst system of this invention, the alkylation rate increased 67% over that obtained with the $AlCl_3$—$(CH_3)_2CHCl$ catalyst system.

The DEAC-$(CH_3)_2CHCl$ catalyst in benzene gives a homogeneous system while $AlCl_3$ by itself or with $(CH_3)_2CHCl$ does not. Consequently, the catalyst system of this invention is more active, as measured by alkylation rates, than the $AlCl_3$ or $AlCl_3$-alkyl halide catalyst systems. In addition, the greater solubility of the catalyst system of this invention could be the reason for the differences in selectivey.

Two runs, 20 and 21, were performed indicating the non-equivalence of $AlCl_3$—$(CH_3)_2CHCl$ catalyst system to DEAC-$(CH_3)_2CHCl$ catalyst system as to selectivity.

TABLE II

| Run Number: | Aluminum compound [1] | Promoter | Moles of promoter per mole of aluminum compound | Time, minutes | Kilograms of propylene consumed per mole aluminum compound |
|---|---|---|---|---|---|
| 13 | $AlCl_3$ | None | | 10 | 4.3 |
| 14 | $AlCl_3$ | do | | 30 | 7.4 |
| 15 | $AlCl_3$ | $(CH_3)_2CHCl$ | 1.5 | 10 | 6.2 |
| 16 | $AlCl_3$ | $(CH_3)_2CHCl$ | 1.5 | 30 | 8.4 |
| 17 | $AlCl_3$ | $(CH_3)_2CHCl$ | 1.5 | 60 | 10.2 |
| 18 | DEAC | $(CH_3)_2CHCl$ | 1.5 | 10 | 8.3 |
| 19 | DEAC | $(CH_3)_2CHCl$ | 1.5 | 30 | 14.0 |

[1] 0.007 mole of aluminum compound per mole of benzene.

First, a duplicate run of Example III was performed but with 4.5 milliliters of benzene and 12.0 milliliters of 1,3,5-triisopropylbenzene. After four hours, the composition of the reaction mixture of run 20 was as shown in Table III. Run 21 was the same as the previously described run 20 except that it used an equimolar amount of $AlCl_3$ instead of DEAC and a shorter time. The composition of the reaction mixture of run 21 was as shown in Table III in the second column of data.

TABLE III

|  | Run | |
|---|---|---|
|  | 20 | 21 |
| Aluminum compound | DEAC | AlCl₃ |
| Promoter | (CH₃)₂CHCl | (CH₃)₂CHCl |
| Time, minutes | 240 | 60 |
| Percent of reactants converted: | | |
| Benzene | 80 | 90 |
| 1,3,5-triisopropylbenzene | 6 | 40 |
| Product composition, mole percent: | | |
| 1,2,3,5-tetraisopropylbenzene | 20 | None |
| 1,2,4,5-tetraisopropylbenzene | 24 | 19 |
| 1,3,5-triisopropylbenzene | 30 | 51 |
| 1,2,4-triisopropylbenzene | 10 | 12 |
| 1,3-diisopropylbenzene | 2 | 3 |
| 1,4-diisopropylbenzene | 6 | 5 |
| Cumene | 4 | 4 |
| Benzene | 4 | 2 |
| Unknown |  | 4 |
| Total | 100 | 100 |

Note in the comparison shown in Table III that the amount of 1,2,3,5-tetraisopropylbenzene produced with $AlCl_3$ was essentially nil compared to the 20% produced with the DEAC. This difference occurred even though the percent of reactants converted in the presence of $AlCl_3$ was greater than that for DEAC; 90% benzene versus 80% benzene; 40% triisopropylbenzene versus 6% triisopropylbenzene.

Runs indicating the non-equivalence of $CCl_4$-alkyl aluminum chloride catalyst systems to isopropyl chloride-alkyl aluminum chloride catalyst systems were performed. The operating conditions and product compositions from these runs, i.e., 22, 23 and 24 are shown in Table IV.

The non-equivalence of $CCl_4$-DEAC to $(CH_3)_2CHCl$-DEAC as catalyst systems can be seen by comparing run 22, shown in Table IV, with runs 1 to 3, shown in Table I. In run 22, with $CCl_4$ as the alkyl chloride, no reaction occurred after 60 minutes at 0° C. and no reaction was observed even when the temperature was raised to 50° C. By comparison, runs 1 to 3 showed substantial activity with $(CH_3)_2CHCl$ as the alkyl halide promoter.

Also, the non-selectivity of $CCl_4$ as a promoter compared to the selectivity of the promoters as defined herein can be seen by comparing runs 23 and 24 (Table IV) with Example II. In runs 23 and 24, using $CCl_4$ as a promoter, no 1,2,3,5-tetraisopropylbenzene was produced after 60 minutes, however, in Example II, using isopropyl chloride as a promoter, 85% of the products formed was 1,2,3,5-tetraisopropylbenzene.

When other organo-aluminum halides as herein defined are substituted for the DEAC, EASC and EADC used in the foregoing examples substantially equivalent results are obtained. Also, the use of other alkyl halides as above described in place of the isopropyl chloride, isobutyl chloride or n-amyl chloride used gives analogous results. When monoolefinic hydrocarbons, as defined herein, other than the propylene used in the foregoing examples are used as the alkylating agent, substantially equivalent results are achieved. Also, when aromatic hydrocarbons as herein defined are substituted for benzene and 1,3,5-triisopropylbenzene used in the foregoing examples, analogous results are obtained.

TABLE IV

|  | Run | | |
|---|---|---|---|
|  | 22[2,3] | 23[2] | 24[2] |
| Alkyl chloride | CCl₄ | CCl₄ | CCl₄ |
| DEAC, milliliters | 2.2 |  |  |
| EASC, milliliters |  | 5.0 |  |
| EADC, milliliters |  |  | 2.0 |
| Temperature, °C | 0 | 0 | 0 |
| Time, minutes | 60 | 60 | 60 |
| Product composition: | | | |
| Benzene | (¹) | 31 | 33 |
| Cumene | (¹) | 1 | 3 |
| 1,3-diisopropylbenzene | (¹) | 5 | 7 |
| 1,4-diisopropylbenzene | (¹) |  |  |
| 1,3,5-triisopropylbenzene | (¹) | 47 | 47 |
| 1,2,4-triisopropylbenzene | (¹) |  |  |
| 1,2,4,5-tetraisopropylbenzene | (¹) | 12 | 7 |
| 1,2,3,5-tetraisopropylbenzene | (¹) | None | None |
| Other | (¹) | 4 | 3 |

¹ No reaction.
² 4.4 milliliters of benzene, 12.0 milliliters of 1,3,5-triisopropylbenzene and 10 milliliters of CCl₄ were used. A propylene pressure of 1 atmosphere was maintained.
³ At the end of 60 minutes, the temperature of mixture was raised from 0° C. to 50° C. and still no reaction occurred.

The invention claimed is:

1. A process for alkylating an aromatic hydrocarbon with a monoolefin which comprises reacting an aromatic hydrocarbon having at least two unsubstituted ring positions with the monoolefin at a temperature in the range of −50° C. to +50° C. in the presence of a catalyst system which is a combination of (a) $RAlX_2$, $R_2AlX$ or $R_3Al_2X_3$ wherein X is chlorine, bromine or iodine and R is an alkyl group having 1 to 8 carbon atoms and (b) an alkyl chloride, bromide or iodide having 3 to 8 carbon atoms.

2. A process according to claim 1 wherein the aromatic hydrocarbon has the formula:

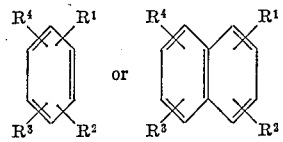

wherein each of $R^1$, $R^2$, $R^3$ and $R^4$ is H or an alkyl group with 1 to 12 carbon atoms.

3. A process according to claim 2 wherein each R group of the aromatic hydrocarbon is H or an alkyl group with 1 to 6 carbon atoms.

4. A process according to claim 1 wherein the monoolefin has the formula $C_nH_{2n}$ or $C_nH_{2n-2}$ and $n$ is 3 to 12.

5. A process according to claim 1 wherein the alkyl halide contains 3 to 6 carbon atoms.

6. A process according to claim 5 wherein the alkyl halide is isopropyl chloride, t-butyl chloride or n-amyl chloride.

7. A process according to claim 1 wherein said temperature is in the range of −30° C. to +30° C.

8. A process according to claim 1 wherein the R in $RAlX_2$, $R_2AlX$ and $R_3Al_2X_3$ contains 1 to 4 carbon atoms.

9. A process for alkylating an aromatic hydrocarbon having the formula:

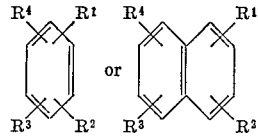

wherein each of $R^1$, $R^2$, $R^3$ and $R^4$ is H or an alkyl group with 1 to 6 carbon atoms with a monoolefin having the formula $C_nH_{2n}$ where $n$ is 3 to 12 at a temperature in the range of −30° C. to +30° C. in the presence of a catalyst system which is a combination of (a) $RAlX_2$, $R_2AlX$ or $R_3Al_2X_3$ wherein X is chlorine or bromine and R is an alkyl group having 1 to 4 carbon atoms and (b) an alkyl chloride or bromide having 3 to 6 carbon atoms.

10. A process according to claim 9 wherein the alkyl halide is isopropyl chloride, t-butyl chloride or n-amyl chloride.

11. A process according to claim 9 wherein the alkyl aluminum halide is diethyl aluminum chloride, ethyl aluminum sesquichloride or ethyl aluminum dichloride.

References Cited

UNITED STATES PATENTS 3,031,514  4/1962  Kosmin.
3,094,568  6/1963  Hay et al.
3,097,246  7/1963  Favis.
3,312,748  4/1967  Johnson.

DELBERT E. GANTZ, Primary Examiner
C. R. DAVIS, Assistant Examiner

U.S. Cl. X.R.
260—668